United States Patent [19]
Jones

[11] Patent Number: 6,111,718
[45] Date of Patent: Aug. 29, 2000

[54] ELECTRONIC RECORD/PLAY SWITCH WITH LOW NOISE LOW INPUT IMPEDANCE PREAMPLIFIER

[75] Inventor: James W. Jones, Woodside, Calif.

[73] Assignee: Ampex Corporation, Redwood City, Calif.

[21] Appl. No.: 09/093,117

[22] Filed: Jun. 8, 1998

[51] Int. Cl.[7] .............................. G11B 5/02; G11B 15/12
[52] U.S. Cl. .................................. 360/67; 360/68; 360/62
[58] Field of Search .................................. 360/62, 67, 68, 360/46

[56] References Cited

U.S. PATENT DOCUMENTS

| | | | |
|---|---|---|---|
| 4,203,139 | 5/1980 | Horiuchi | 360/62 |
| 5,204,790 | 4/1993 | Yang | 360/68 |
| 5,249,087 | 9/1993 | Berkheimer | 360/62 |
| 5,852,527 | 12/1998 | Fujii | 360/68 |

*Primary Examiner*—W. Chris Kim
*Attorney, Agent, or Firm*—George B. Almeida; John G. Mesaros; Joel D. Talcott

[57] ABSTRACT

The present application discloses an electronic switching device in combination with a low noise, low input impedance preamplifier circuit. The resulting electronic preamp assembly is specifically configured so that it can be directly interchanged with existing mechanical relay/preamplifier assemblies such as those presently in use in recorder/reproducer apparatus having dual function record/playback heads, without disturbing the associated operating parameters of the record or playback channels. The electronic preamp assembly includes a balun transformer and a solid state switch coupled from a record amplifier to the record/playback head via a rotary transformer to define the record channel. The playback channel includes a diode bridge switch and a preamp circuit also coupled to the rotary transformer and head. The playback channel is electrically isolated from the record channel, and vice versa, via the solid state switch and diode bridge switch in response to a select play/record mode signal applied thereto.

15 Claims, 6 Drawing Sheets

ELECTRONIC RECORD/PLAY SWITCH WITH LOW NOISE LOW INPUT IMPEDANCE PREAMPLIFIER

BACKGROUND OF THE INVENTION

The present invention relates to data recorder/reproducer head switching and preamplifying apparatus and, more particularly, to an electronic switching means for dual function record/playback heads, which means include a low noise, low input impedance preamplifier circuit in the playback path.

In certain types of tape recorder/reproducers wherein each transducing head serves for both the record and playback functions, it is necessary to provide switch means for switching each dual function head between a record path and a playback path in order to provide the corresponding recording and reproducing functions, respectively, via the same head. Typical of such recorder/reproducer apparatus is the DCRsi family of recorder/reproducers manufactured by Ampex Corporation, Redwood City, Calif.

In such tape recorders typically in present use, a preamplifier assembly located in the playback path includes the stator portion of a rotary transformer. The mating rotor portion of the transformer is part of an adjacent scanner assembly in which the dual function record/playback heads are located. The rotary transformer thus provides the electrical connection between the heads and a record driver amplifier in the record path, as well as between the heads and the preamplifier assembly in the playback path. Since each head serves both record and playback, the preamplifier assembly includes the switching means to connect each head either to a respective internal preamplifier assembly or to a respective record driver amplifier located in an adjacent assembly.

In the present state of the art, the switching function typically is done using mechanical relays. As long as the relays are working well they have the advantage of very low "on" resistance and very low "off" capacitance. These attributes, together with an inherent tolerance to high record signal voltages, and negligible contribution to playback noise, have been difficult to achieve in an electronic replacement for the mechanical relay. However, the mechanical relays have a poor contact reliability performance thus requiring excessive maintenance and replacement.

Accordingly, it would be highly desirable to provide an electronic switching means which not only exhibit the very low "on" resistance and "off" capacitance of the mechanical relays, but which also are directly interchangeable with existing mechanical relays without disturbing related circuit parameters such as, for example, the playback and record pilot phases.

SUMMARY OF THE INVENTION

The present invention overcomes the problems of poor contact reliability consistent with typical mechanical relay switching apparatus presently used in recorder/reproducers with dual function record/playback heads, by providing an electronic switching means integral with a preamplifier assembly, hereinafter generally referred to as "an electronic preamp assembly." The electronic preamp assembly of the invention provides low noise, low input impedance characteristics and is directly interchangeable with existing mechanical relay/preamp assemblies in that playback pilot phase as well as record pilot phase have been matched to those of the mechanical relay/preamp assemblies presently in use.

To this end, the present invention provides a record path wherein a conventional record (driver) preamplifier supplies a record signal to a stator portion of a conventional rotary transformer via a balanced-to-unbalanced (balun) transformer and a solid state switch means. A rotor portion of the rotary transformer is coupled to the dual function record/playback head. The solid state switch means is responsive to a select play/record mode signal to connect the record amplifier to the rotary transformer and head during a record process, or to disconnect, that is, electronically isolate, the record amplifier and record path during a playback process.

During the playback process, the solid state switch means similarly electronically isolates the record path, whereby the stator portion of the rotary transformer is coupled to a preamplifier circuit of the preamp assembly of the invention, via diode bridge switch means included within a feedback loop of the preamplifier circuit. Each record/playback head is provided with a respective electronic preamp assembly and the playback signal of each head is output via a line driver/pre-emphasis stage.

DETAILED DESCRIPTION OF THE EMBODIMENT

Figure 1:
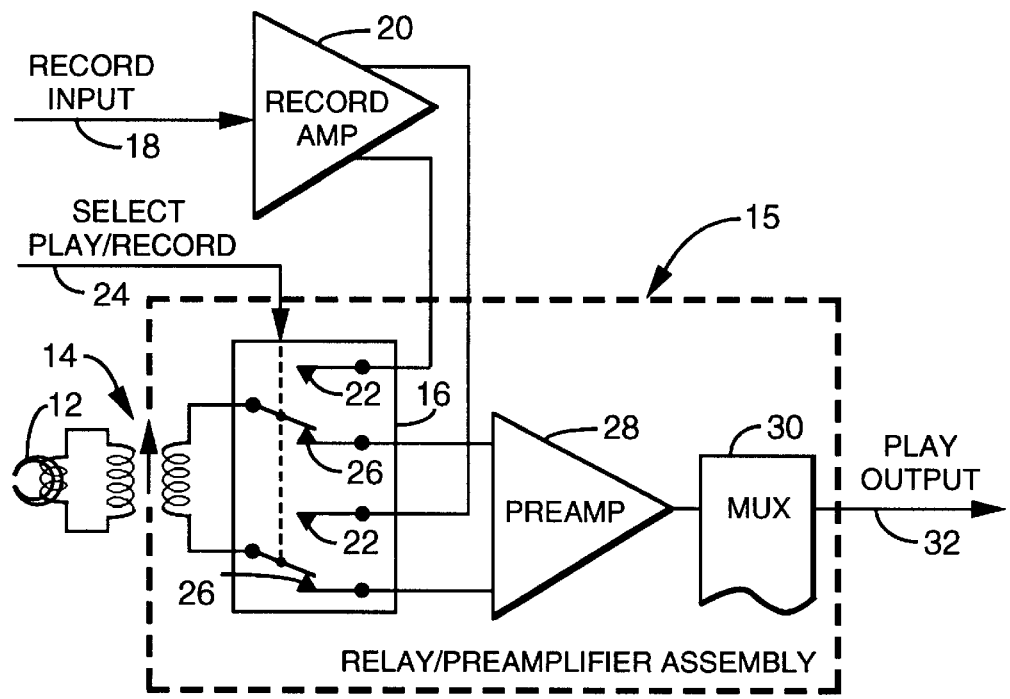
FIG. 1 is a block diagram illustrating a typical prior art mechanical relay in combination with a prior art preamplifier circuit.

FIG. 1 depicts a prior art combination of a mechanical relay and preamplifier assembly typically used in a recorder/reproducer having dual function record/playback heads. A single head 12, an associated record channel and a playback channel are shown by way of example. The record/playback head 12 is coupled to the rotor of a rotary transformer 14, whose stator is part of a mechanical relay/preamplifier assembly 15, hereinafter referred to as a (prior art) "relay/preamp assembly" 15. The stator is coupled to common contacts of a mechanical relay 16. A record signal is supplied via an input 18 to a record driver amplifier 20 which in turn is coupled to a pair of record contacts 22 of the relay 16. The components 18, 20 and 12, 14, 16 define the record path or channel when the relay 16 is switched to the contacts 22 via a select record state of a select play/record mode signal supplied via a lead 24.

A pair of playback contacts 26 of the relay 16 are coupled to a preamplifier circuit 28, whose output is coupled to a multiplexer (MUX) 30 which provides a playback signal from the relay/preamp assembly 15 on an output lead 32. The MUX 30 provides means for selecting, one at a time, the playback signal from the preamplifier circuit 28 in the respective channel, or from other like preamplifier circuits in other respective channels as described further in the FIGS.

3–4. The components 28, 30, 32 and 12, 14, 16 thus define the playback path or channel when the select play/record mode signal on the lead 24 switches the relay 16 to the playback contacts 26 via the application of a select play state.

Figure 2:
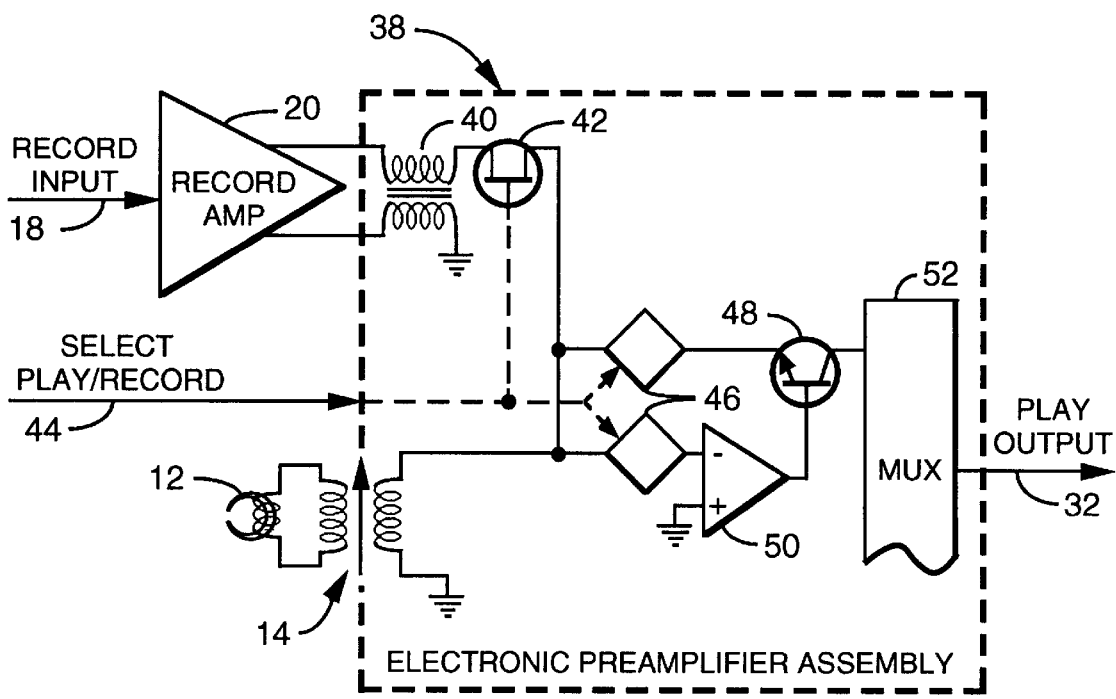
FIG. 2 is a block diagram illustrating an electronic preamplifier assembly of the present invention, for replacing the relay/preamplifier assembly of FIG. 1.

FIG. 2 illustrates an embodiment of the present invention wherein the mechanical relay 16 and preamplifier circuit 28 of FIG. 1 are replaced by an electronic switch means and preamplifier circuit of the invention. In the figures, similar components are similarly numbered. Thus, the record signal on the lead 18 is coupled to the record driver amplifier 20 previously shown in FIG. 1. The record amplifier 20 is thence coupled to an electronic preamplifier assembly 38 of the invention, hereinafter referred to as a (present) "electronic preamp assembly" 38. Likewise, the record/playback head 12 is coupled to the rotor of the rotary transformer 14 as in FIG. 1, wherein the stator of the transformer then forms part of the preamp assembly 38 of the invention.

The preamp assembly 38 includes a balanced-to-unbalanced (balun) transformer 40, with one winding coupled from the record amplifier 20 to ground and the other winding coupled from a second output of the amplifier 20 to a solid state switch means 42 formed of a field effect transistor (FET) arrangement. The switch means 42 is enabled or disabled by a select play/record mode signal, equivalent to that of FIG. 1, on multiple leads 44 (see also FIG. 5). The switch means 42 is coupled to one terminal of the stator of the rotary transformer 14 with the other terminal of the stator coupled to ground. The balun transformer 40 and the solid state switch means 42, together with the record amplifier 20, the rotary transformer 14 and the head 12, define the record path or channel of the invention.

The stator of the rotary transformer 14 also is coupled to a diode bridge switch means 46, one output of which is coupled to an emitter electrode of a transistor means 48, with another output coupled to an inverting input of a preamplifier circuit 50. The non-inverting input of the preamplifier circuit 50 is coupled to ground and the output thereof is coupled to the base electrode of the transistor means 48. Thus the diode bridge switch means 46 is included within a feedback loop of the preamplifier circuit 50. It is to be understood that the diode bridge switch means 46 and the transistor means 48 are in actuality integral with the preamplifier circuit 50, as described in FIGS. 4A–4C below. The collector electrode of the transistor means 48 provides the output of the preamp assembly 38 on the output lead 32 via a multiplexer (MUX) 52 similar in function to the multiplexer 30 of previous mention in FIG. 1, i.e. the selection of respective playback channels. The diode bridge switch means 46, the preamplifier circuit 50 and the transistor means 48, together with the rotary transformer 14, the head 12 and the multiplexer 52, define the playback channel when the solid state switch means 42 is disabled and the diode bridge switch means 46 and preamplifier circuit 50 are enabled via respective logic states of the select play/record mode signal on the leads 44.

Figure 3:
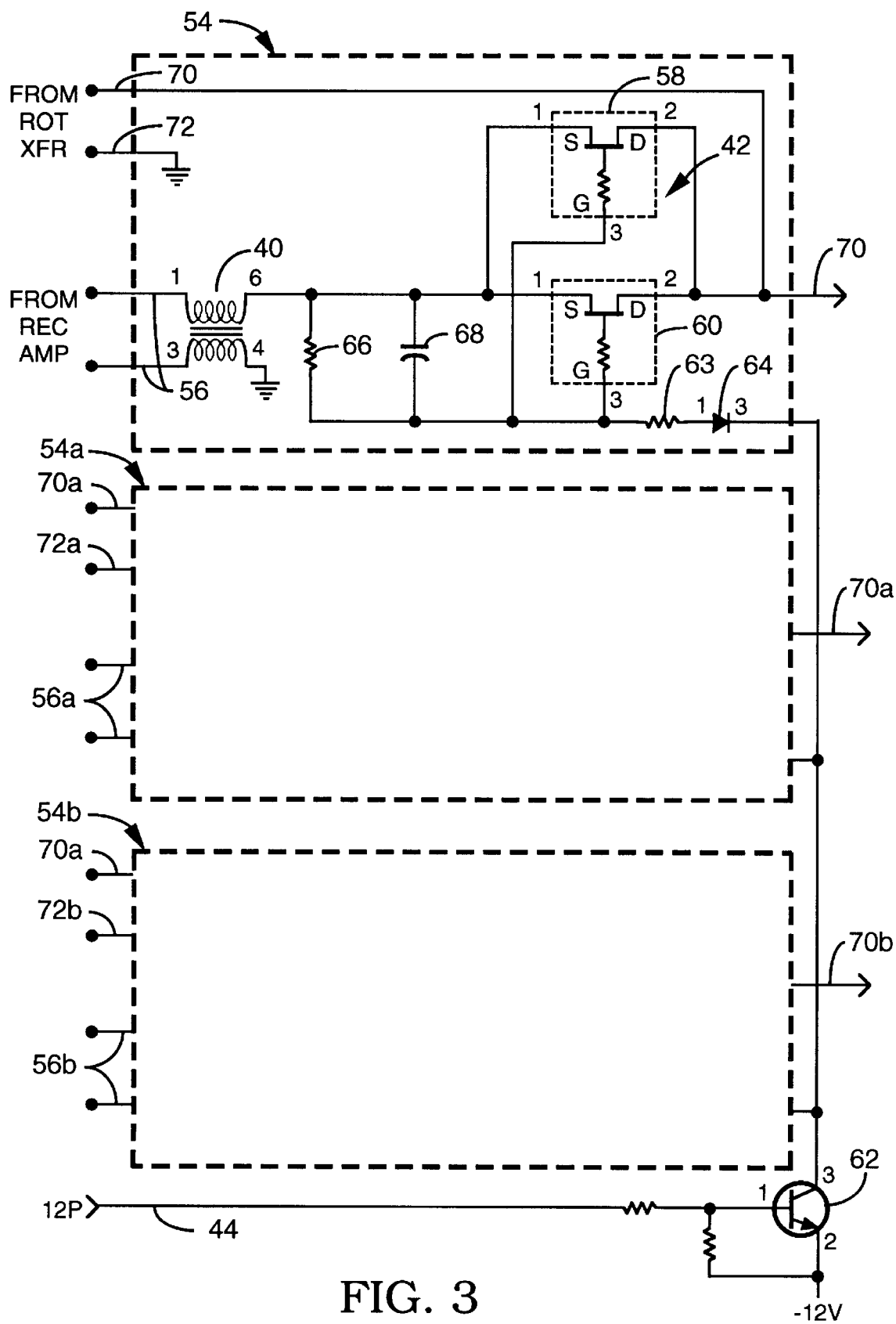
FIG. 3 is a schematic diagram illustrating an embodiment of a record path portion of the embodiment of FIG. 2 for three record/playback heads and respective channels.
Figure 4A:
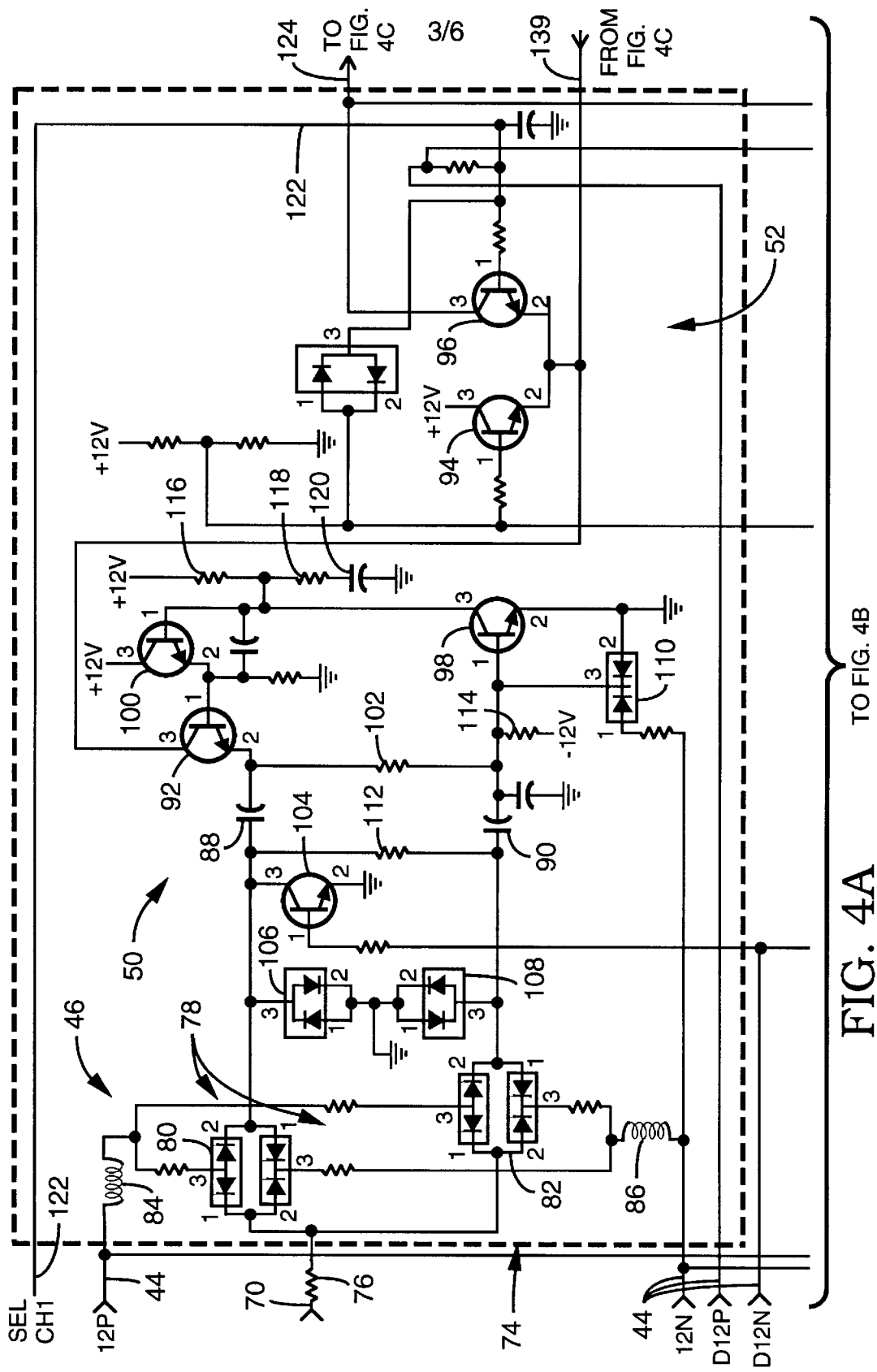
FIGS. 4A, 4B and 4C are a schematic diagram illustrating an embodiment of a playback path portion of the embodiment of FIG. 2 for three playback channels.
Figure 4B:
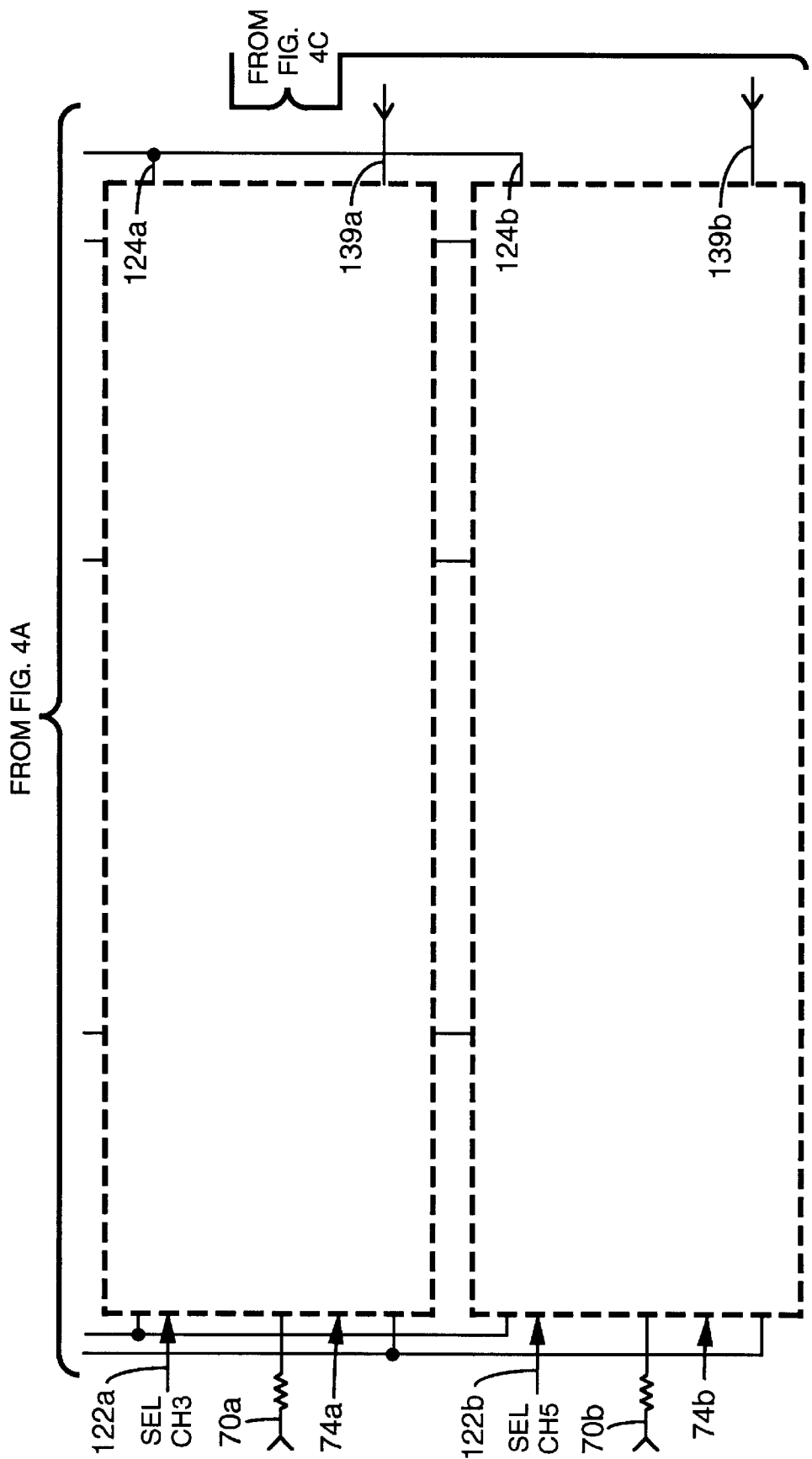
Figure 4C:
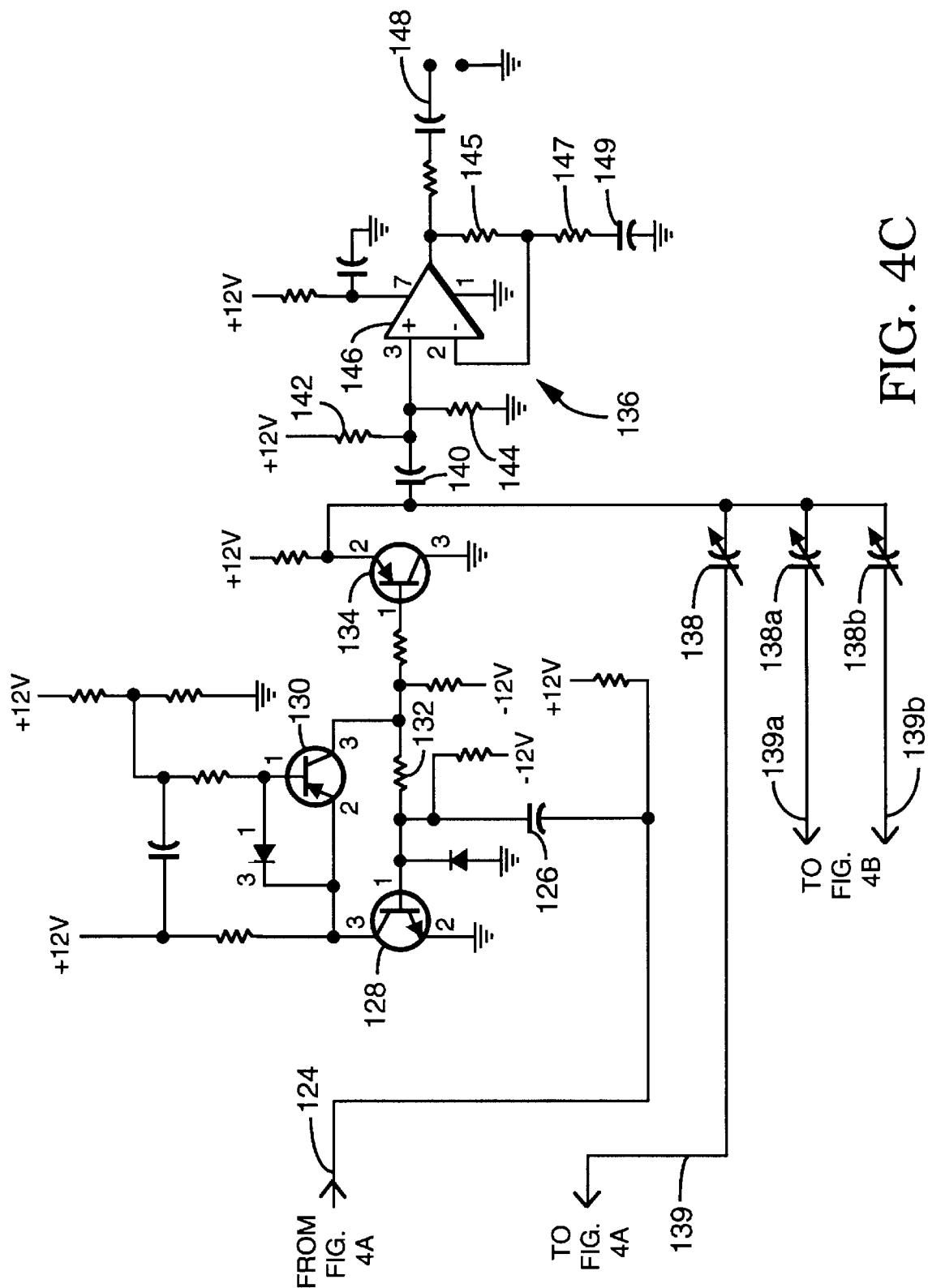
Figure 5:
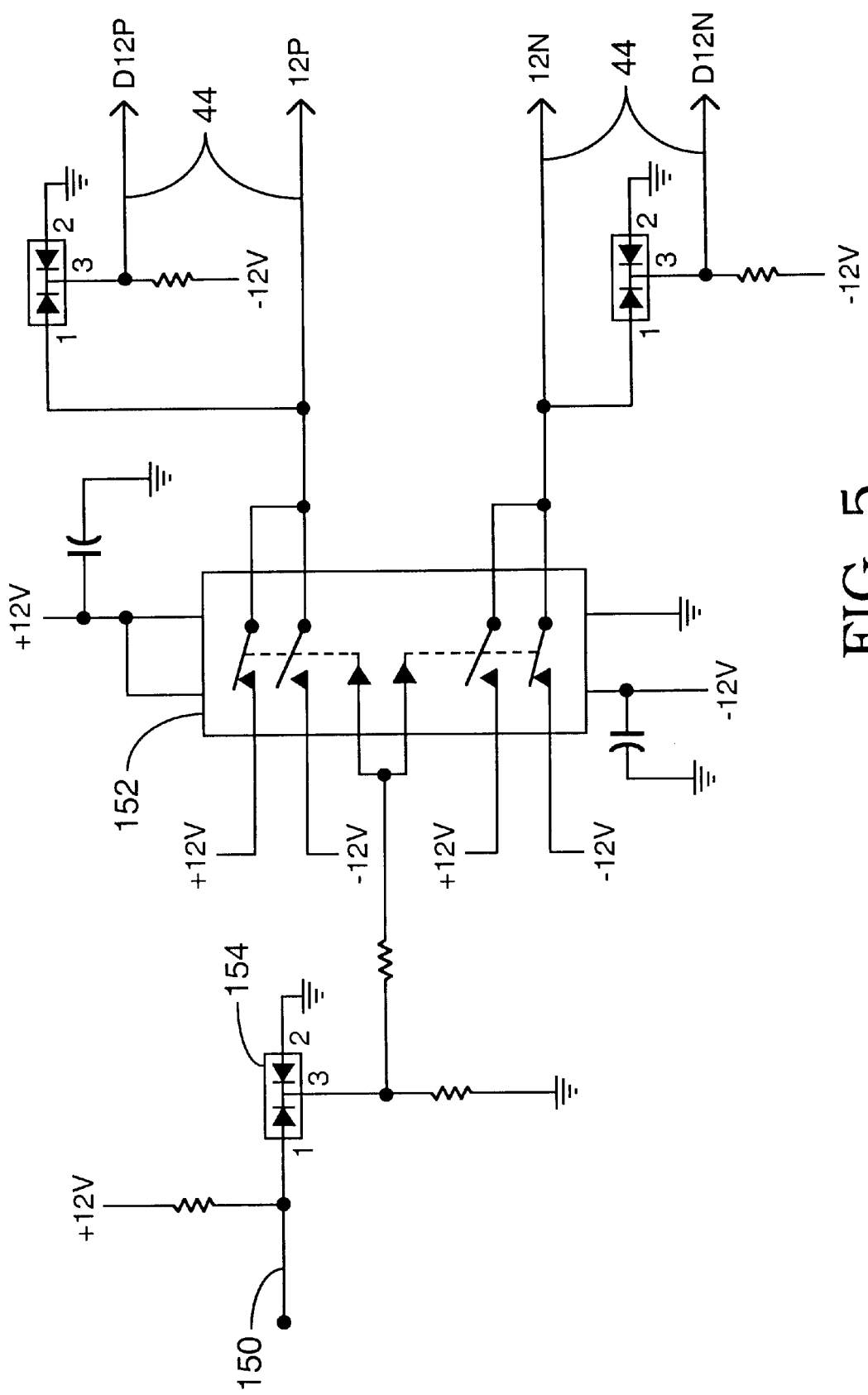
FIG. 5 is a schematic diagram illustrating an embodiment of a circuit for generating select play/record mode signals for controlling the selection of the record and playback modes of operation of the circuits of FIGS. 3, 4A, 4B, 4C.

The FIGS. 3–5 together illustrate a particular embodiment of the invention corresponding to the general embodiment 38 illustrated in block diagram in FIG. 2, that uses a pair of identical printed circuit boards, one being referred to as the odd board, the other as the even board. The odd board is associated with multiple odd channels and record/playback heads 1, 3, 5, etc., and the even board is associated with multiple even channels and record/playback heads 2, 4, 6, etc. To simplify the description, generally only the odd board functions are described herein by way of example. FIG. 3 illustrates further details of a record channel 54 and in particular illustrates the record paths (and partial playback paths) for three dual function record/playback heads such as illustrated by the head 12 of FIGS. 1, 2. Likewise, the record amplifier 20 of FIGS. 1, 2 is omitted in FIG. 3, which shows the record amplifier output signals, derived from the record signal of lead 18, on leads 56 extending to the balun transformer 40 of previous mention. The solid state switch means 42 of FIG. 2 is coupled in FIG. 3 to the balun transformer 40 and includes two GaAs FETs 58, 60 connected in parallel in the record path. The gates of the FETs 58, 60 are coupled to a select signal of the select play/record mode signal of previous mention on the lead 44, via a control transistor 62, a resistor 63 and a diode 64. The select mode signal comprises a number of select signals generated by the circuit illustrated in FIG. 5 and described below. The select signal also is coupled to the source electrodes of the FETs 58, 60 via the diode 64 and resistors 63, 66 and capacitor 68. The output of the parallel FETs 58, 60 is supplied on a lead 70 which, together with a lead 72 to ground, extend to the rotary transformer 14 of previous mention in FIG. 2. The lead 70 also extends to the preamplifier (preamp) circuit of FIGS. 4A, 4B, 4C as further described below.

Record channels for two other odd numbered record/playback heads are illustrated by the blocks 54a and 54b which are identical to the channel 54 described above, and which provide respective outputs 70a and 70b extending to respective record/playback heads as well as to respective preamp circuits, as illustrated in FIGS. 4A, 4B, 4C.

Two GaAs FETs in parallel are used so that the series resistance of the present preamp assembly when in the record mode, matches that of the prior art relay/preamp assembly and thus avoids the need to readjust recorded pilot phase when a prior art relay/preamp assembly (15) is replaced by an electronic preamp assembly (38) of the present invention.

In operation, the differential input from the head record driver amplifier 20 (FIG. 2) is received at leads 56 of FIG. 3. The balun transformer 40 converts this balanced input to an unbalanced record signal, and the single ended output of the transformer 40 is passed via biased-on FETs 58, 60 to the leads 70, 72. The latter two output leads connect to the rotary transformer 14 coupled to the head 12. When in the record mode, the playback path of the lead 70 extending to the preamp circuit of FIGS. 4A, 4B, 4C is open circuit, and is described in more detail in the playback channels of FIGS. 4A, 4B, 4C.

To adapt the low breakdown voltage GaAs FETs 58, 60 to the high voltage signal from the record driver 20, the record mode select signal on leads 44 turns off control transistor 62, allowing the gates of the FETs to float. The resistor 66 and capacitor 68 connect the source and gate terminals of the FETs to obtain the "on" state of the FETs. Thus all terminals of the FETs 58, 60 float in common and are equally driven by the RF record signal, thus avoiding voltage breakdown problems. Each FET has a series resistance of approximately 0.7 Ohms. Two FETs in parallel contribute 0.35 Ohms to the record path. This is close enough to the series resistance of two replay contacts, such as used in the prior art relay/preamp assembly of FIG. 1, so that there is negligible impact on the record pilot phase. With a view to direct interchangeability of the prior art relay/preamp assembly with the present electronic preamp assembly of the invention, record pilot phase has been matched to that of the prior art replay/preamp assembly. As further shown below, the playback pilot phase also is matched to optimize the interchangeability.

Referring to FIGS. 4A, 4B, 4C, the lead 70 from FIG. 3 is supplied to a preamplifier circuit 74 of the invention which comprises the playback channel, together with a portion of the circuit of FIG. 3 and the record/playback head 12 illustrated in FIG. 2. Similarly, leads 70a and 70b from FIG. 3 are supplied to respective preamplifier circuits 74a and 74b which comprise the playback channels, together with the respective circuits of FIG. 3, of additional record/playback heads such as, for example, heads number 3 and 5 of the odd board of particular description herein. The preamplifier circuits 74, 74a and 74b are identical and accordingly only the circuit 74 of the first head playback channel is illustrated in FIG. 4 and described herein to simplify the description. Play mode is selected from software via the select play/record mode signal on the leads 44. The record driver amplifier 20 is turned off in this mode, but it still provides a DC path for connection of the leads 56 (FIG. 3) so that the source terminals of FETs 58, 60 are biased to ground. These FETs are turned off by application of approximately −6 vDC to their gates via the diode 64 and the attenuator formed by the resistors 63, 66 using −12V from the control transistor 62 when "on."

The single ended signal from the rotary transformer 14 of FIG. 2, becomes a playback signal on the lead 70 of FIG. 3, and is shown (FIG. 4A) applied to a resistor 76 as input to a first stage of the switched low input impedance preamplifier 74. The resistor 76 provides for tailoring of the input resistance of the amplifier for compatibility with an existing prior art relay/preamplifier assembly which is to be replaced.

Switching means 78 at the input of the preamplifier circuit 74 uses conventional current controlled diode bridges 80, 82 corresponding to the switch means 46 of FIG. 2. Such bridges can withstand high voltages in the "off" state to protect the preamplifier from high voltage record signals. For "on" state parameters, pin diodes were chosen to minimize series resistance and noise contribution for the 40 to 50 MHz frequency region where the recorder/reproducer system peak noise occurs (pin diodes behave like ordinary diodes at low frequencies, but at RF frequencies, charge storage effects make them behave as low value resistors instead of diodes). Inductors 84, 86 supply switched positive and negative bias voltage to the bridge circuits, and are self resonant in this same 40 to 50 MHz frequency range. Although a frequency range of 40 to 50 MHz is mentioned, it is to be understood that this exemplary embodiment of the invention is intended for operation at frequencies extending from near DC to greater than 200 MHz. The high impedance of the inductors 84, 86 around resonance serves to minimize noise contribution of the bias current circuit. The DC resistance of the diode bridges 80, 82 far exceeds the input resistance of the relay/preamplifier assembly that is replaced. Therefore, the switching bridges 80, 82 are enclosed within a feedback loop having low frequency open loop gain of about 300, so that the bridge contribution to the low frequency input resistance is divided by this amount. This condition and the gain of about 300 is discussed further below.

Input coupling capacitors 88, 90 also are included within the feedback loop, allowing use of small capacitors, this being of some importance to allow squeezing parts into the available space. For example, because of the feedback loop gain, the effective value of the capacitor 88 is increased to 30 microfarads ($\mu F$) (0.1 $\mu \times 300$).

Apart from the switching, the first stage of the preamp circuit 74 behaves like an idealized common base amplifier located at a transistor 92. With this simplified interpretation, head current arriving at the resistor 76 flows straight through the diode bridge 80, the capacitor 88 and the idealized transistor 92, into a pair of transistors 94, 96 of a next, channel selection, stage of the preamplifier circuit 74.

In more detail, the first stage of the preamplifier circuit 74 has a forward gain path from the resistor 76 through the diode bridge 82, through the coupling capacitor 90 and a common emitter amplifier transistor 98. An amplified signal at the collector of the transistor 98 is buffered by an emitter follower transistor 100 and the transistor 92, to produce an intermediate forward path voltage signal at the emitter of the transistor 92. A resistor 102 completes a DC bias feedback path to the base of the transistor 98.

The capacitor 88 and the diode bridge 80 complete the main AC feedback path to the input at the diode bridge junction with the resistor 76. Also along this AC feedback path, a transistor 104 and back-to-back diodes 106 are inactive, so presently may be ignored, as may be back-to-back diodes 108 and diodes 110 in the forward path. Also, a resistor 112 has no function in play mode, and has a large enough value that it also may be neglected.

Returning to DC bias considerations, voltage at the base of the transistor 98 is approximately 0.7 v. Then current through a resistor 114 having a 47 KOhm value, is 12.7/47K=0.27 milliamps (ma). Neglecting the base current of the transistor 98, all of this current flows through the resistor 102 setting DC voltage at the emitter of the transistor 92 to 0.27×2+0.7=1.24 v. Adding two emitter follower diode voltages of 0.7 v each to this, the collector of the transistor 98 is biased at 1.24+1.4=2.64 v. Then a resistor 116 has approximately 10 volts across its 10K Ohm value, thus establishing a collector bias current of about 1 ma on the transistor 98. This makes the emitter resistance of the transistor 98 approximately a value of 26 Ohm, so low frequency gain is 10 k/26, which calculates to a gain of approximately 400. However, a computer spice analysis gives a value of gain of 300, which is the gain value employed herein. At higher frequencies, the 10K collector resistor 116 is shunted by a network formed of a resistor 118 and capacitor 120, which have values chosen to give frequency stability to the first stage of the preamp circuit 74.

It will be observed that the 0.27 ma bias current flowing through the resistor 102 also flows through the transistor 92 and into a current steering selector switch formed of the transistors 94, 96, whose purpose will be described below. The emitter resistance of the transistor 92 is then about (1/0.27)×26 Ohm, i.e., about 100 Ohm. Adding 20 Ohm to this to allow for the DC resistance contribution of the diode bridge 80, the input resistance seen from input resistor 76 is about 120/300=0.4 Ohm. Adding a resistance value of 0.47 Ohm of the resistor 76, the input resistance at 70 of the preamp/switch assembly of the invention is about one ohm. This compares to the prior art relay/preamplifier assembly input resistance of one to three ohms. It's unlikely that the input resistance needs to be matched any better, but the value of the input resistor 76 is readily changed if required.

At higher frequencies, the input impedance of the present preamp/switch assembly increases due to fall off in the open loop gain of the amplifier. But the head source inductive impedance also rises with frequency, so the electronic preamp assembly input impedance can be considered to remain much less than the source impedance through all the higher frequencies of interest.

Turning now to the channel selection stage, the transistors 94, 96 are part of a current steering circuit of previous mention that directs the current output of channel 1 to the second stage of amplifier gain when a channel selection signal on a lead 122, FIG. 4A, is asserted, or otherwise, dumps it to the +12V power supply. In normal use, only one of the channel selectors is asserted at a time via the application of a respective channel selection signal on the lead 122 (or on leads 122a, 122b of FIG. 4B). The selection stage is organized to be compatible with the existing selection circuit of a transport interconnect board of the recorder/reproducer apparatus, while also providing approximately +3 VDC bias to the collector of the transistor 92 of the previous stage. The channel selection stage then supplies the corresponding playback signal for the selected channel to the second amplifier stage via a lead 124 (which also is coupled to leads 124a and 124b of preamp circuits 74a, 74b of FIG. 4B).

Referring now to the second amplifier stage of previous mention, FIG. 4C, the playback signal is provided from the channel selected stage via the lead 124 (and 124a or 124b), and is AC coupled via a capacitor 126 to the base of a transistor 128. The transistor 128 and a transistor 130 comprise a low noise operational amplifier, with a feedback resistor 132 connected between the operational amplifier output and its virtual ground input (base of the transistor 128). Essentially all of the signal current flows through the resistor 132 to establish a voltage signal output that is buffered by an emitter follower transistor 134, and is passed to a conventional line driver 136.

The high frequency response of the operational amplifier is adjustable by means of a variable capacitor 138, 138a or 138b of a respective channel, which feeds back via a lead 139, 139a or 139b to the current steering selector circuit of the selected channel and thence back to the base of the transistor 128 of the second amplifier stage. That is, the selected adjustable capacitor behaves as if it were located across the resistor 132, which matches the architecture of a prior art relay/preamp assembly which is to be replaced.

The signal from the second amplifier stage is coupled into the line driver stage 136 via a capacitor 140 coupled to DC bias resistors 142, 144 at the input of a current feedback operational amplifier 146. The value of the time constant of capacitor 140 with resistors 142, 144 in parallel, is chosen so that the playback pilot phase of the preamp assembly of the invention matches that of the prior art relay/preamp assembly. The operational amplifier 146 is connected in non-inverting configuration. A feedback network 145, 147, 149 provides pre-emphasis. Drive impedance is 50 Ohm for a resulting coax output playback signal on an output terminal 148.

FIG. 5 illustrates details of generally conventional circuitry for generating mode switching voltages corresponding to the select play/record mode signals on leads 44, in response to a play mode selection signal at an input lead 150. The play mode selection signal is supplied as a switching signal to a switch means 152 via diodes 154. The switch means 152 is coupled to selected positive and negative 12V sources in response to the logic level of the selection signal. In turn, the switch means provides +12 V and/or −12 V mode selection signals to the solid state switch means 42 in the record channel, as well as to the diode bridge switch means 46 and the preamp circuit 50 of the playback channel, via the leads 44, as also shown in FIGS. 2, 3 and 4A, 4B, 4C.

Although the invention has been described herein relative to specific embodiments, various additional features and advantages will be apparent from the description and drawings, and thus the scope of the invention is defined by the following claims and their equivalents.

What is claimed is:

1. An electronic preamplifier assembly for switching a record/playback head between record and playback channels so that a high voltage RF record signal is supplied to the head or a playback signal is retrieved by the head, comprising:

means for providing select record and select playback mode signals;

electronic switch means for supplying the high voltage RF record signal to the record/playback head while the playback channel is electronically isolated in response to the select record mode signal;

said electronic switch means including transformer means for supplying an unbalanced high voltage RF record signal, and a pair of low voltage FETs having respective terminals and configured in parallel to receive the unbalanced high voltage RF record signal;

wherein the terminals of the pair of low voltage FETs float in common in response to the select record mode signal and are equally driven by the unbalanced high voltage RF record signal, thereby allowing the low voltage FETs to handle the high voltage RF signal without breaking down; and preamplifier circuit means for receiving the playback signal from the record/playback heads while electronically isolating the record channel in response to the select playback mode signal.

2. The assembly of claim 1 wherein the low voltage FETs include respective gate and source terminals including:

capacitor means for tying the gate and source terminals of the low voltage FETs together; and said select playback record mode signal being applied to said gate terminals.

3. An electronic preamplifier assembly for switching a record/playback head between record and playback channels so that a record signal is supplied to the head or a playback signal is retrieved by the head, comprising:

means for providing select record and select playback mode signals;

electronic switch means including solid state switch means for completing the record channel and for supplying the record signal to the record/playback head while electronically isolating the playback channel in response to the select record and playback mode signals;

preamplifier circuit means for receiving the playback signal from the record/playback head and including diode bridge switch means for completing the playback channel while electronically isolating the record channel in response to the select playback mode signals;

wherein the electronic switch means includes;

transformer means receiving the record signal for providing an unbalanced record signal; and solid state switch means responsive to the unbalanced record signal for supplying the signal to the record/playback head when enabled by the select record mode signal.

4. The assembly of claim 3 wherein:

the transformer means comprises a balanced-to-unbalanced transformer; and the solid state switch means includes a pair of FETs configured in parallel and having gate electrodes, wherein the FETs complete the record channel in response to application of the select record mode signal to the gate electrodes, and isolate the record channel in response to the application of the select playback mode signal.

5. The assembly of claim 4 further including a rotary transformer coupled to the record/playback head, wherein:

the FETs are connected to the preamplifier circuit means, and also to the record/playback head via the rotary transformer.

6. An electronic preamplifier assembly for switching a record/playback head between record and playback channels so that a record signal is supplied to the head or a playback signal is retrieved by the head, comprising:

means for providing select record and select playback mode signals;

electronic switch means for supplying the record signal to the record/playback head while the playback channel is electronically isolated in response to the select record mode signal;

preamplifier circuit means for receiving the playback signal from the record/playback head while the record channel is electronically isolated in response to the select playback mode signal;

wherein the preamplifier circuit means includes;

diode bridge switch means for receiving the playback signal when enabled by the select playback mode signal;

a preamplifier circuit coupled to the diode bridge switch means; transistor means coupled from the preamplifier circuit back to the diode bridge switch means; and wherein the transistor means forms a feedback loop which includes the diode bridge switch means, and the transistor means provides the playback signal from the playback channel.

7. The assembly of claim 6, wherein:

the diode bridge switch means complete the playback channel in response to the select playback mode signal and isolate the playback channel in response to the select record mode signal.

8. The assembly of claim 6 wherein:

the diode bridge switch means include a pair of current controlled diode bridges responsive to the select playback mode signal, with one of the bridges being located at the input of the preamplifier circuit and the other bridge being located at the output of the preamplifier circuit via the transistor means, to define thereby the feedback loop.

9. An electronic preamplifier assembly having a low input impedance matching that of an existing mechanical relay preamplifier assembly, for switching a dual function record/playback head between record and playback channels, comprising:

means for providing select play/record mode signals to the record and playback channels;

a balun transformer in the record channel for receiving a record signal and for supplying an unbalanced record signal;

a solid state switch for supplying the unbalanced record signal to the head and for enabling and disabling the record channel in response to the respective select record and play mode signals;

diode bridge switch means in the playback channel for receiving a playback signal from the head; and preamplifier means integral with the diode bridge switch means for outputting the playback signal in response to application of the select play mode signal to the diode bridge switch means and the preamplifier means.

10. The assembly of claim 9 wherein the record signal is a high voltage RF signal, wherein the solid state switch includes low voltage FETs configured in parallel and having source and gate electrodes, wherein the electrodes of said FETs float in common in response to the select record mode signal to supply the record signal to the head while isolating the head from the playback channel.

11. The assembly of claim 10, wherein the parallel FETs have a series resistance in the record mode which matches that of the mechanical relay preamplifier assembly when in the record mode.

12. The assembly of claim 9 wherein the playback channel includes a first stage, formed of the diode bridge switch means and a transistor which together form a feedback loop, for receiving a playback signal from the head.

13. The assembly of claim 12 including a channel selection stage coupled to the first stage, and a second amplifier stage coupled to the channel selection stage for supplying the playback signal of the selected channel.

14. The assembly of claim 12 wherein the first stage includes:

a forward gain path comprising:

a first coupling capacitor connected to the first diode bridge; and an amplifier transistor coupled between the coupling capacitor and the transistor; and the feedback loop comprising;

a second diode bridge receiving the playback signal; and a second coupling capacitor coupled between the second diode bridge and the transistor.

15. A method for electronically switching a dual function record/playback head between record and playback channels to provide recording of a record signal and playing back of a playback signal, comprising:

providing select play/record mode signals to the record and playback channels;

supplying an unbalanced record signal commensurate with the record signal;

selectively supplying the unbalanced record signal to the head as the record signal via an electronic solid state switch while electronically isolating the playback channel from the head in response to the select record mode signal;

supplying the playback signal to preamplifying means via electronic diode bridge switch means while electronically isolating the record channel from the head in response to the select play mode signal; and providing the preamplified playback signal as the playback signal.

\* \* \* \* \*